United States Patent [19]
Dokic et al.

[11] Patent Number: 6,012,142
[45] Date of Patent: Jan. 4, 2000

[54] METHODS FOR BOOTING A MULTIPROCESSOR SYSTEM

[75] Inventors: Miroslav Dokic; Raghunath Rao; Terry Ritchie; James Divine; Jeffrey Niehaus; Zheng Luo, all of Austin, Tex.

[73] Assignee: Cirrus Logic, Inc.

[21] Appl. No.: 08/970,794

[22] Filed: Nov. 14, 1997

[51] Int. Cl.[7] .................................................. G06F 9/445
[52] U.S. Cl. ................................................. 713/2; 714/36
[58] Field of Search ................................... 395/651, 652; 380/20; 713/1, 2; 714/30, 36

[56] References Cited

U.S. PATENT DOCUMENTS

| | | | |
|---|---|---|---|
| 5,070,450 | 12/1991 | Holman, Jr. et al. | 713/300 |
| 5,117,486 | 5/1992 | Clark et al. | 364/230.5 |
| 5,173,933 | 12/1992 | Jabs et al. | 379/58 |
| 5,233,654 | 8/1993 | Harvey et al. | 380/20 |
| 5,257,377 | 10/1993 | Sathi et al. | 395/700 |
| 5,450,576 | 9/1995 | Kennedy | 714/13 |
| 5,659,748 | 8/1997 | Kennedy | 395/652 |
| 5,664,195 | 9/1997 | Chatterji | 395/712 |

*Primary Examiner*—Joseph E. Palys
*Assistant Examiner*—Abu Hossain
*Attorney, Agent, or Firm*—James J. Murphy, Esq.; J. P. Violette, Esq.

[57] ABSTRACT

A message is transferred from external device through a first processor and from the first processor to a second processor. A check is made that the message passed to the second processor without error. The message is interpreted by a selected one of the first and second processors. Boot operations are performed by the selected processor in response to the interpretation of the message.

19 Claims, 9 Drawing Sheets

METHODS FOR BOOTING A MULTIPROCESSOR SYSTEM

CROSS-REFERENCE TO RELATED APPLICATION

The following co-pending and co-assigned application contains related information and is hereby incorporated by reference: Ser. No. 08/970,979 (Attorney Docket No. 0680-CS), entitled "DIGITAL AUDIO DECODING CIRCUITRY, METHODS AND SYSTEMS", filed Nov. 14, 1997, 1997;

Ser. No. 08/970,372 (Attorney Docket No. 0801-CS), entitled "METHODS FOR BOOTING A MULTIPROCESSOR SYSTEM", filed Nov. 14, 1997, 1997;

Ser. No. 08/964,883 (Attorney Docket No. 0801-CS), entitled "METHODS FOR DEBUGGING A MULTIPROCESSOR SYSTEM", filed Nov. 14, 1997, 1997;

Ser. No. 08/969,884 (Attorney Docket No. 0803-CS), entitled "METHODS FOR UTILIZING SHARED MEMORY IN A MULTIPROCESSOR SYSTEM", filed Nov. 14, 1997, 1997;

Ser. No. 08/970,796 (Attorney Docket No. 0804-CS), entitled "ZERO DETECTION CIRCUITRY AND METHODS", filed Nov. 14, 1997, 1997;

Ser. No. 08/970,841 (Attorney Docket No. 0805-CS), entitled "A VOLTAGE CONTROLLED CRYSTAL OSCILLATOR", filed Nov. 14, 1997, 1997;

Ser. No. 08/971,080 (Attorney Docket No. 0806-CS), entitled "METHOD FOR ERROR CONCEALMENT IN AN AUDIO DECODING SYSTEM", filed Nov. 14, 1997, 1997.

Ser. No. 08/970,302 (Attorney Docket No. 0807-CS), entitled "METHODS FOR DEBUGGING A MULTIPROCESSOR SYSTEM", filed Nov. 14, 1997, 1997.

BACKGROUND OF THE INVENTION

1. Field of the Invention

The present invention relates in general to data processing and in particular, to methods of booting a multiprocessor system.

2. Description of the Related Art

The ability to process audio information has become increasingly important in the personal computer (PC) environment. Among other things, audio support is important requirement for many multimedia applications, such as gaming and telecommunications. Audio functionality is therefore typically available on most conventional PCs, either in the form of an add-on audio board or as a standard feature provided on the motherboard itself. In fact, PC users increasingly expect not only audio functionality but high quality sound capability. Additionally, digital audio plays a significant role outside the traditional PC realm, such as in compact disk players, VCRs and televisions. As the audio technology progresses, digital applications are becoming increasingly sophisticated as improvements in sound quality and sound effects are sought.

One of the key components in many digital audio information processing systems is the decoder. Generally, the decoder receives data in a compressed form and converts that data into a decompressed digital form. The decompressed digital data is then passed on for further processing, such as filtering, expansion or mixing, conversion into analog form, and eventually conversion into audible tones. In other words the decoder must provide the proper hardware and software interfaces to communicate with the possible compressed (and decompressed) data sources, as well as the destination digital and/or audio devices. In addition, the decoder must have the proper interfaces required for overall control and debugging by a host microprocessor or microcontroller. Since, there are a number of different audio compression/decompression formats and interface definitions, such as Dolby AC-3 and S/PDIF (Sony/Phillips Digital Interface), a state of the art digital audio decoder should at least be capable of supporting multiple compression/decompression formats.

Booting almost always must be performed on power up or hardware reset of a integrated hardware and software system or device. During a typical boot operation, memories may be tested and prepared to store subsequently received data, hardware may be tested and prepared for operation, and similar operations may be performed as required to set the system or device in operating condition. As devices and systems increase in complexity, and multiple processing blocks must be configured, the booting scheme correspondingly becomes more sophisticated. This is especially true for advanced audio data processing systems in which multiple processing blocks must be configured on power-up or hardware reset.

SUMMARY OF THE INVENTION

According to the principles of the present invention, a method is disclosed for booting a multiple processor system. A message is transferred from an external device through a first processor and from the first processor to a second processor. A check is made that the message passed to the second processor without error. Messages interpreted by a selected one of the first and second processors which performs boot operations in response to the interpreted message.

These principles advantageously provide for efficiently configuring integrated hardware and software system, and in particular, multiprocessing system and devices. For example, these principles may advantageously be applied to such multiple processing systems, as multiple processor audio decoders and the like.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A–5C are diagrams describing a boot loading routine;

FIGS. 7A–7D are diagrams of a boot routine referenced to DSPA; and

DESCRIPTION OF THE PREFERRED EMBODIMENTS

The principles of the present invention and their advantages are best understood by referring to the illustrated embodiment depicted in FIGS. 1–8 of the drawings, in which like numbers designate like parts.

Figure 1A:
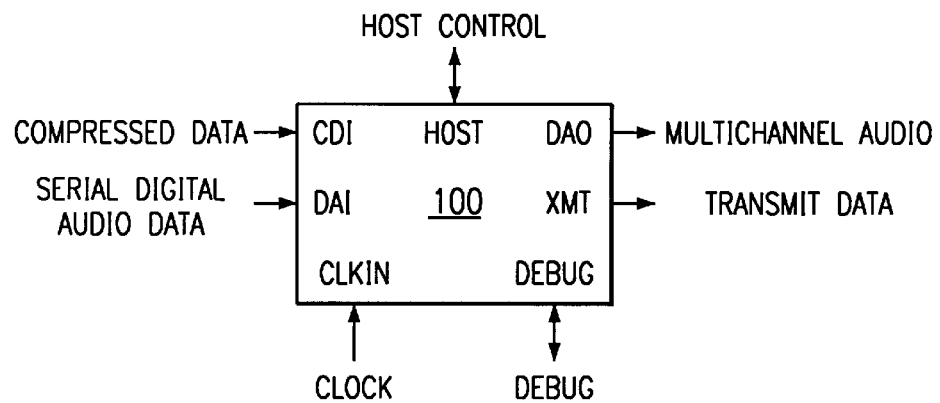
FIG. 1A is a diagram of a multichannel audio decoder embodying the principles of the present invention.

FIG. 1A is a general overview of an audio information decoder 100 embodying the principles of the present invention. Decoder 100 is operable to receive data in any one of a number of formats, including compressed data conforming to the AC-3 digital audio compression standard, (as defined by the United States Advanced Television System Committee) through a compressed data input (CDI) port. An independent digital audio data (DAI) port provides for the input of PCM, S/PDIF, or non-compressed digital audio data.

A digital audio output (DAO) port provides for the output of multiple-channel decompressed digital audio data. Independently, decoder 100 can transmit data in the S/PDIF (Sony-Phillips Digital Interface) format through a transmit port XMT.

Decoder 100 operates under the control of a host microprocessor through a host port HOST and supports debugging by an external debugging system through the debug port DEBUG. The CLK port supports the input of a master clock for generation of the timing signals within decoder 100.

While decoder 100 can be used to decompress other types of compressed digital data, it is particularly advantageous to use decoder 100 for decompression of AC-3 bits streams.

Therefore, for understanding the utility and advantages of decoder 100, consider the case of when the compressed data received at the compressed data input (CDI) port has been compressed in accordance with the AC-3 standard.

Generally, AC-3 data is compressed using an algorithm which achieves high coding gain (i.e., the ratio of the input bit rate to the output bit rate) by coarsely quantizing a frequency domain representation of the audio signal. To do so, an input sequence of audio PCM time samples is transformed to the frequency domain as a sequence of blocks of frequency co-efficients. Generally, these overlapping blocks, each of 512 time samples, are multiplied by a time window and transformed into the frequency domain. Because the blocks of time samples overlap, each PCM input sample is represented by a two sequential blocks factor transformation into the frequency domain. The frequency domain representation may then be decimated by a factor of two such that each block contains 256 frequency coefficients, with each frequency coefficient represented in binary exponential notation as an exponent and a mantissa.

Next, the exponents are encoded into coarse representation of the signal spectrum (spectral envelope), which is in turn used in a bit allocation routine that determines the number of bits required to encode each mantissa. The spectral envelope and the coarsely quantized mantissas for six audio blocks (1536 audio samples) are formatted into an AC-3 frame. An AC bit stream is a sequence of the AC-3 frames.

In addition to the transformed data, the AC bit stream also includes additional information. For instance, each frame may include a frame header which indicates the bit rate, sample rate, number of encoded samples, and similar information necessary to subsequently synchronize and decode the AC-3 bit stream. Error detection codes may also inserted such that the processing device, such as decoder 100, can verify that each received frame of AC-3 data does not contain any errors. A number of additional operations may be performed on the bit stream before transmission to the decoder. For a more complete definition of AC-3 compression, reference is now made to the digital audio compression standard (AC-3) available from the Advanced Televisions Systems Committee, incorporated herein by reference.

In order to decompress under the AC-3 standard, decoder 100 essentially must perform the inverse of the above described process. Among other things, decoder 100 synchronizes to the received AC-3 bit stream, checks for errors and deformats received AC-3 data audio. In particular, decoder 100 decodes spectral envelope and the quantitized mantissas. A bit allocation routine is used to unpack and de-quantitize the mantissas. The spectral envelope is encoded to produce the exponents, then, a reverse transformation is performed to transform the exponents and mantissas to decoded PCM samples in the time domain.

Figure 1B:
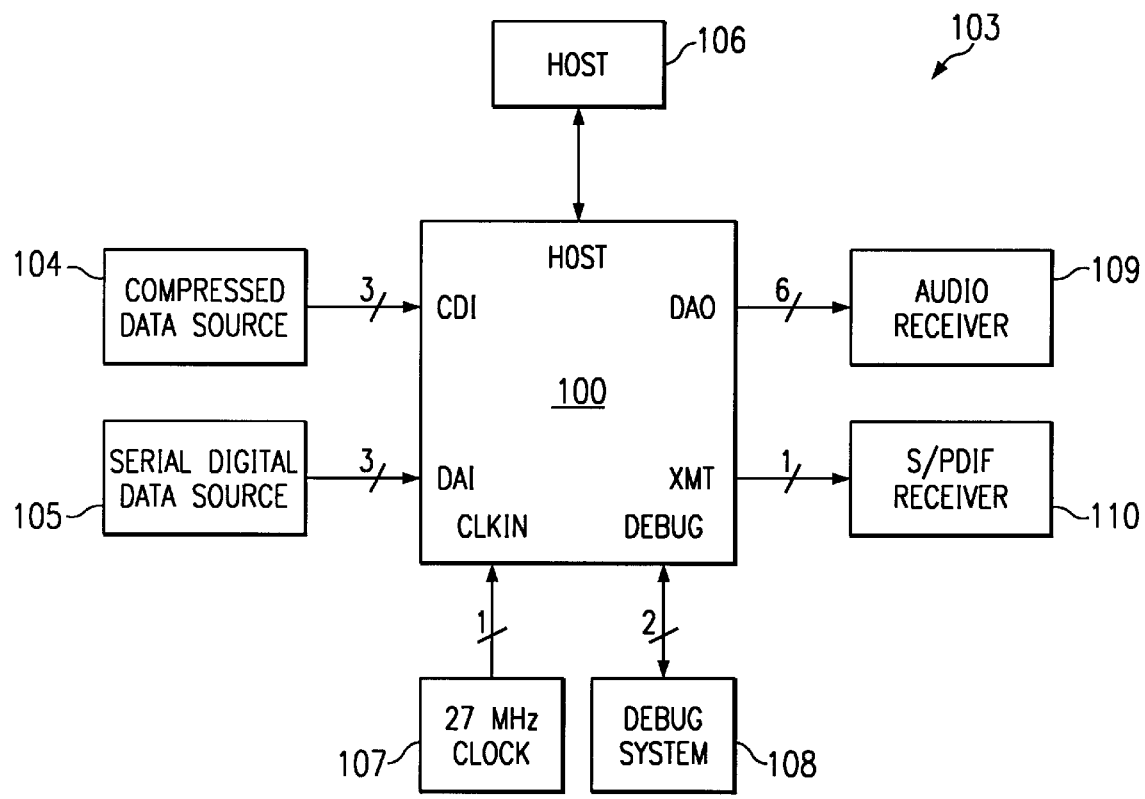
FIG. 1B is a diagram showing the decoder of FIG. 1 in an exemplary system context.

FIG. 1B shows decoder 100 embodied in a representative system 103. Decoder 100 as shown includes three compressed data input (CDI) pins for receiving compressed data from a compressed audio data source 104 and an additional three digital audio input (DAI) pins for receiving serial digital audio data from a digital audio source 105. Examples of compressed serial digital audio sources 105, and in particular of AC-3 compressed digital sources, are digital video discs and laser disc players.

Host port (HOST) allows coupling to a host processor 106, which is generally a microcontroller or microprocessor that maintains control over the audio system 103. For instance, in one embodiment, host processor 106 is the microprocessor in a personal computer (PC) and System 103 is a PC-based sound system. In another embodiment, host processor 106 is a microcontroller in an audio receiver or controller unit and system 103 is a non-PC-based entertainment system such as conventional home entertainment systems produced by Sony, Pioneer, and others. A master clock, shown here, is generated externally by clock source 107. The debug port (DEBUG) consists of two lines for connection with an external debugger, which is typically a PC-based device.

Decoder 100 has six output lines for outputting multichannel audio digital data (DAO) to digital audio receiver 109 in any one of a number of formats including 3-lines out, 2/2/2, 4/2/0, 4/0/2 and 6/0/0. A transmit port (XMT) allows for the transmission of S/PDIF data to a S/PDIF receiver 110. These outputs may be coupled, for example, to digital to analog converters or codecs for transmission to analog receiver circuitry.

Figure 1C:
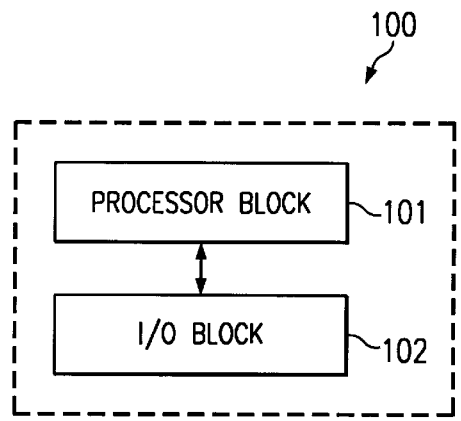
FIG. 1C is a diagram showing the partitioning of the decoder into a processor block and an input/output (I/O) block.

FIG. 1C is a high level functional block diagram of a multichannel audio decoder 100 embodying the principles of the present invention. Decoder 100 is divided into two major sections, a Processor Block 101 and an I/O Block 102. Processor Block 106 includes two digital signal processor (DSP) cores, DSP memory, and system reset control. I/O Block 102 includes interprocessor communication registers, peripheral I/O units with their necessary support logic, and interrupt controls. Blocks 101 and 102 communicate via interconnection with the I/O buses of the respective DSP cores. For instance, I/O Block 102 can generate interrupt requests and flag information for communication with Processor Block 101. All peripheral control and status registers are mapped to the DSP I/O buses for configuration by the DSPs.

Figure 2:
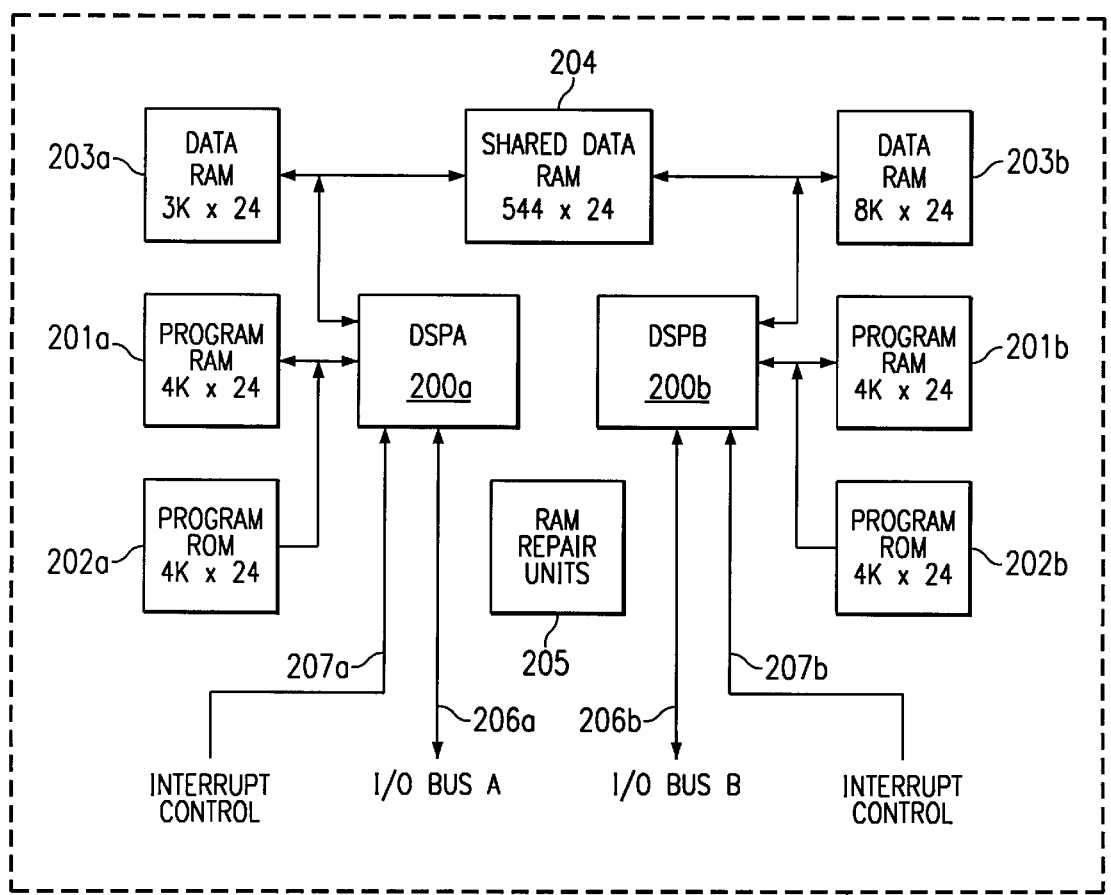
FIG. 2 is a diagram of the processor block of FIG. 1C.

FIG. 2 is a detailed functional block diagram of processor block 101. Processor block 101 includes two DSP cores 200a and 200b, labeled DSPA and DSPB respectively. Cores 200a and 200b operate in conjunction with respective dedicated program RAM 201a and 201b, program ROM 202a and 202b, and data RAM 203a and 203b. Shared data RAM 204, which the DSPs 200a and 200b can both access, provides for the exchange of data, such as PCM data and processing coefficients, between processors 200a and 200b. Processor block 101 also contains a RAM repair unit 205 that can repair a predetermined number of RAM locations within the on-chip RAM arrays to increase die yield.

DSP cores 200a and 200b respectively communicate with the peripherals through I/O Block 102 via their respective I/O buses 206a, 206b. The peripherals send interrupt and flag information back to the processor block via interrupt interfaces 207a, 207b.

Figure 3:
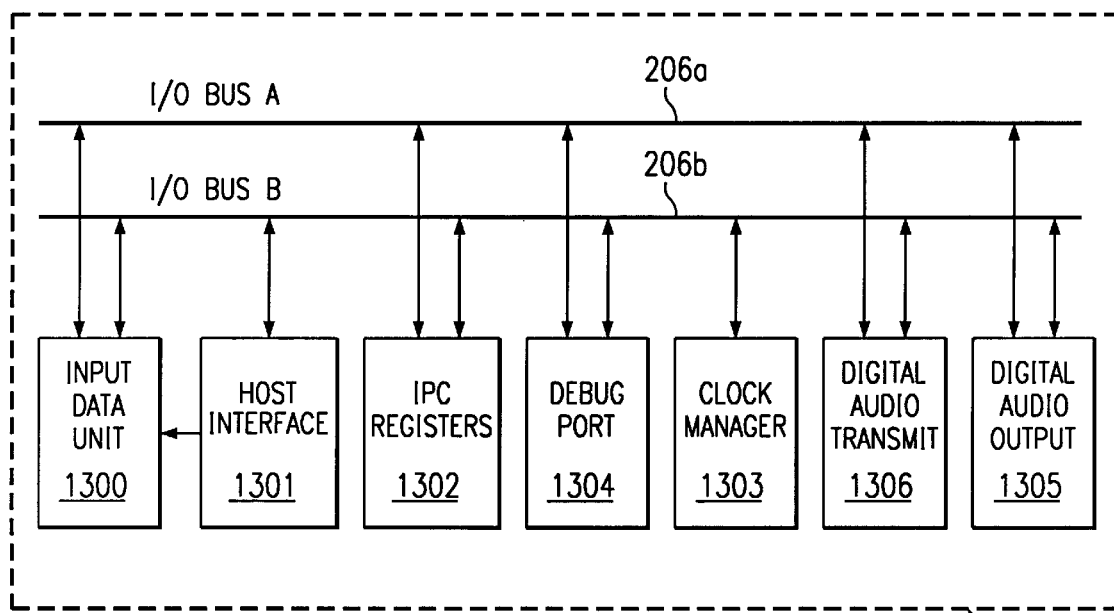
FIG. 3 is a diagram of the primary functional subblock of the I/O block of FIG. 1C.

FIG. 3 is a detailed functional block diagram of I/O block 102. Generally, I/O block 102 contains peripherals for data input, data output, communications, and control. Input Data Unit 1300 accepts either compressed analog data or digital audio in any one of several input formats (from either the CDI or DAI ports). Serial/parallel host interface 1301 allows an external controller to communicate with decoder 100 through the HOST port. Data received at the host interface port 1301 can also be routed to input data unit 1300.

IPC (Inter-processor Communication) registers 1302 support a control-messaging protocol for communication between processing cores 200 over a relatively low-bandwidth communication channel. High-bandwidth data can be passed between cores 200 via shared memory 204 in processor block 101.

Clock manager 1303 is a programmable PLL/clock synthesizer that generates common audio clock rates from any selected one of a number of common input clock rates through the CLKIN port. Clock manager 1303 includes an STC counter which generates time stamp information used by processor block 101 for managing playback and synchronization tasks. Clock manager 1303 also includes a programmable timer to generate periodic interrupts to processor block 101.

Debug circuitry 1304 is provided to assist in applications development and system debug using an external DEBUGGER and the DEBUG port, as well as providing a mechanism to monitor system functions during device operation.

A Digital Audio Output port 1305 provides multichannel digital audio output in selected standard digital audio formats. A Digital Audio Transmitter 1306 provides digital audio output in formats compatible with S/PDIF or AES/EBU.

In general, I/O registers are visible on both I/O buses, allowing access by either DSPA (200a) or DSPB (200b). Any read or write conflicts are resolved by treating DSPB as the master and ignoring DSPA.

Figure 4:
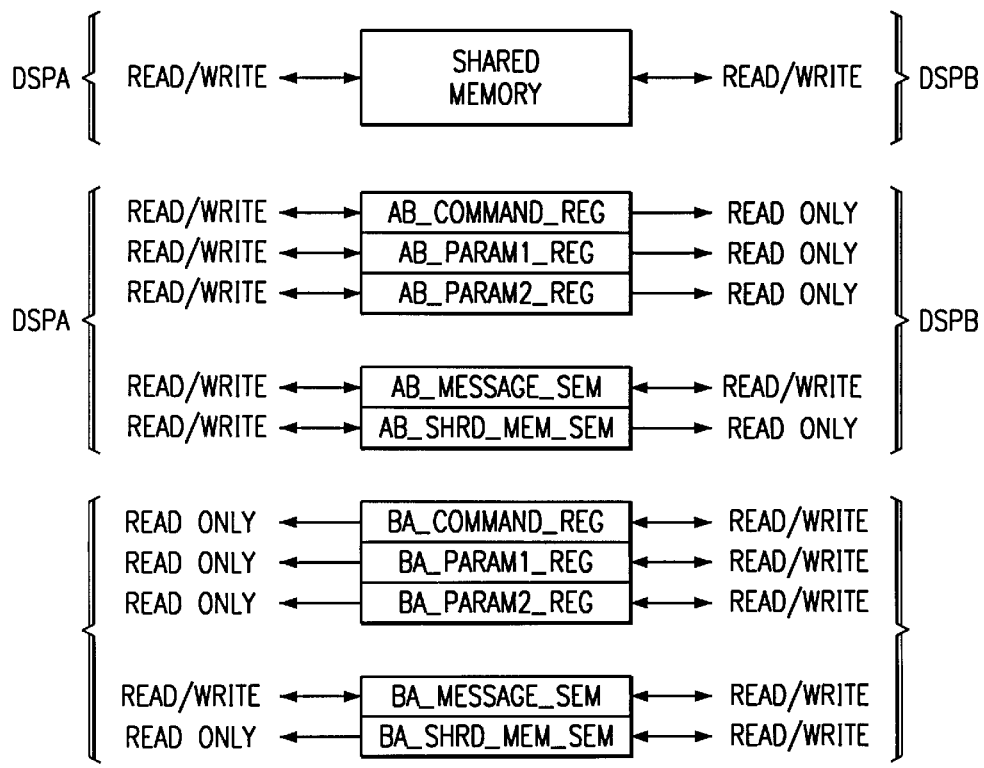
FIG. 4 is a diagram representing the shared memory space and IPC registers (1302)

FIG. 4 is a diagram representing the shared memory space and IPC registers (1302). The principles of the present invention further allow for methods of decoding compressed audio data, as well as for methods and software for operating decoder 100. These principles will be discussed in further detail below. Initially, a brief discussion of the theory of operation of decoder 100 will be undertaken.

The Host can choose between serial and parallel boot modes during the reset sequence. The Host interface mode and autobit mode status bits, available to DSPB 200b in the HOSTCTL register MODE field, control the boot mode selection. Since the host or an external host ROM always communicates through DSPB, DSPA 200a receives code from DSPB 200b in the same fashion, regardless of the host mode selected.

In a dual-processor environment like decoder 100, it is important to partition the software application optimally between the two processors 200a, 200b to maximize processor usage and minimize inter-processor communication. For this the dependencies and scheduling of the tasks of each processor must be analyzed. The algorithm must be partitioned such that one processor does not unduly wait for the other and later be forced to catch up with pending tasks. For example, in most audio decompression tasks' including Dolby AC-3, the algorithm being executed consists of 2 major stages: 1) parsing the input bitstream with specified/computed bit allocation and generating frequency-domain transform coefficients for each channel; and 2) performing the inverse transform to generate time-domain PCM samples for each channel. Based on this and the hardware resources available in each processor, and accounting for other housekeeping tasks the algorithm can be suitably partitioned.

Usually, the software application will explicitly specify the desired output precision, dynamic range and distortion requirements. Apart from the intrinsic limitation of the compression algorithm itself, in an audio decompression task the inverse transform (reconstruction filter bank) is the stage which determines the precision of the output. Due to the finite-length of the registers in the DSP, each stage of processing (multiply+accumulate) will introduce noise due to elimination of the lesser significant bits. Adding features such as rounding and wider intermediate storage registers can alleviate the situation.

For example, Dolby AC-3 requires 20-bit resolution PCM output which corresponds to 120 dB of dynamic range. The decoder uses a 24-bit DSP which incorporates rounding, saturation and 48-bit accumulators in order to achieve the desired 20-bit precision. In addition, analog performance should at least preserve 95 dB S/N and have a frequency response of +/−0.5 dB from 3 Hz to 20 kHz.

In a complex real-time system (embedded or otherwise) each sub-system has to perform its task correctly, at the right time and cohesively with all other sub-systems for the overall system to work successfully. While each individual sub-system can be tested and made to work correctly, first attempts at integration most often result in system failure. This is particularly true of hardware/software integration. While the new design methodology, according to the principals of the present invention, can considerably reduce hardware/software integration problems, a good debug strategy incorporated at the design phase can further accelerate system integration and application development. A major requirement of the debug strategy that it should be simple and reliable for it to be confidently used as a diagnostic tool.

Debuggers can be of two kinds: static or dynamic. Static debugging involves halting the system and altering/viewing the states of the various sub-systems via their control/status registers. This offers a lot of valuable information especially if the system can automatically "freeze" on a breakpoint or other trapped event that the user can pre-specify. However, since the system has been altered from its run-time state, some of the debug actions/measurements could be irrelevant, e.g.. timer/counter values.

Dynamic debugging allows one to do all the above while the system is actually running the application. For example, one can trace state variables over time just like a signal on an oscilloscope. This is very useful in analyzing real-time behavior. Alternatively, one could poll for a certain state in the system and then take suitable predetermined action.

Both types of debugging require special hardware with visibility to all the sub-systems of interest. For example, in a DSP-based system-on-a-chip such as decoder 100, the debug hardware would need access to all the sub-systems connected to the DSP core, and even visibility into the DSP core. Furthermore, dynamic debugging is more complex than its static counterpart since one has to consider problems of the debug hardware contending with the running sub-systems. Unlike a static debug session, one cannot hold off all the system hardware during a debug session since the system is active. Typically, this requires dual-port access to all the targeted sub-systems.

While the problems of dynamic debugging can be solved with complicated hardware there is a simpler solution which is just as effective while generating only minimal additional processor overhead. Assuming that there is a single processor (like a DSP core 200a or 200b), in the system with access to all the control/state variables of interest, a simple interrupt-based debug communication interface can be built for this processor. The implementation could simply be an additional communication interface to the DSP core. For example, this interface could be 2-wire clock+data interface where a debugger can signal read/write requests with rising/falling edges on the data line while holding the clock line high, and debug port sends back an active low acknowledge on the same data line after the subsequent falling edge of the clock.

A debug session involves read/write messages sent from an external PC (debugger) to the processor via this simple debug interface. Assuming multiple-word messages in each debug session, the processor accumulates each word of the message by taking short interrupts from the main task and reading from the debug interface. Appropriate backup and restore of main task context are implemented to maintain transparency of the debug interrupt. Only when the processor 200a, 200b accumulates the entire message (end of message determined by a suitable protocol) is the message serviced. In case of a write message from the PC, the processor writes the specified control variable(s) with specified data.

In case of a read request from the PC, the processor compiles the requested information into a response message, writes the first of these words into the debug interface and simply returns to its main task. The PC then pulls out the response message words via the same mechanism—each read by the PC causes an interrupt to the processor which reloads the debug interface with the next response word till the whole response message is received by the PC.

Such a dynamic debugger can easily operate in static mode by implementing a special control message from the PC to the processor to slave itself to the debug task until instructed to resume the application.

When there are more than one processor in the system the conventional debug strategy discussed above advantageously can be used in multiprocessor systems such as decoder 100, since there is already provision for dual port access to all the sub-systems of interest. However, to use the above simplified strategy in a dual-DSP system like decoder 100 requires changes.

Each processor in such a system will usually have dedicated resources (memory, internal registers etc.) and some shared resources (data input/output, inter-processor communication, etc.). A dedicated debug interface for each processor is also possible, but is avoided since it is more expensive, requires more connections, and increases the communication burden on the PC. Instead, the preferred method is using a shared debug interface through which the PC user can explicitly specify which processor is being targeted in the current debug session via appropriate syntax in the first word of the messaging protocol. On receiving this first word from the PC, the debug interface initiates communication only with the specified processor by sending it an initial interrupt. Once the targeted processor receives this interrupt it reads out the first word, and assumes control of the debug interface (by setting a control bit) and directs all subsequent interrupts to itself. This effectively holds off the other processor(s) for the duration of the current debug session. Once the targeted processor has received all the words in the debug message, it services the message. In case of a write message, it writes the specified control variable(s) with the specified data and then relinquishes control of the debug interface so that the PC can target any desired processor for the next debug session.

In case of a read request, the corresponding read response has to make its way back from the processor to the PC before the next debug session can be initiated. The targeted processor prepares the requested response message, places the first word in the debug interface and then returns to its main task. Once the PC pulls this word out, the processor receives an interrupt to place the next word. Only after the complete response message has been pulled out does the processor relinquish the debug interface so that the PC can start the next debug session with any desired processor.

Since there are multiple processors involved, this scheme advantageously effectively prohibits unsolicited transactions from a processor to the PC debugger. This constraint precludes many contention issues that would otherwise have to be resolved.

Since the PC debugger can communicate with every processor in the system, the scope of control and visibility of the PC debugger includes every sub-system that can be accessed by the individual processors. This is usually quite sufficient for even advanced debugging.

Whether static or dynamic, all the functions of a debugger can be viewed as reading state variables or setting control variables. However, traps and breakpoints are worthy of special discussion.

During a debug session, when the PC user desires to setup a breakpoint at a particular location in the program of the processor, it has to backup the actual instruction at that location and replace it with a trap instruction. The trap is a special instruction designed such that the processor takes a dedicated high priority interrupt when it executes this instruction. It basically allows a pre-planned interruption of the current task.

In the single-processor strategy, when the processor hits a trap it takes an interrupt from the main task, sends back an unsolicited message to the PC, and then dedicates itself to process further debug messages from the PC (switches to static mode). For example the PC could update the screen with all the system variables and await further user input. When the user issues a continue command, the PC first replaces the trap instruction with the backed-up (original) instruction and then allows the processor to revert to the main task (switches to dynamic mode).

In the multi-processor debug strategy, unsolicited messages from a processor to the PC are prohibited in order to resolve hardware contention problems. In such a case, the breakpoint strategy needs to be modified. Here, when a processor hits a trap instruction, it takes the interrupt from its main task, sets a predetermined state variable (for example, Breakpoint_Flag), and then dedicates itself to process further debug messages from the PC (switches to static mode). Having setup this breakpoint in the first place, the PC should be regularly polling the Breakpoint_Flag state variable on this processor—although at reasonable intervals so as not to waste processor bandwidth. As soon as it detects Breakpoint_Flag to be set, the PC issues a debug message to clear this state variable to setup for the next breakpoint. Then, the PC proceeds just as in the single-processor case.

All other program flow debug functions, such as step into, step over, step out of, run to cursor etc. are implemented from the PC by appropriately placing breakpoints and allowing the processor to continue and execute the desired program region.

Based on application and design requirements, a complex real-time system, such as audio decoder 100, is usually partitioned into hardware, firmware and software. The hardware functionality described above is implemented such that it can be programmed by software to implement different applications. The firmware is the fixed portion of software portion including the boot loader, other fixed function code and ROM tables. Since such a system can be programmed, it is advantageously flexible and has less hardware risk due to simpler hardware demands.

There are several benefits to the dual core (DSP) approach according to the principles of the present invention. DSP cores 200A and 200B can work in parallel, executing different portions of an algorithm and increasing the available processing bandwidth by almost 100%. Efficiency improvement depends on the application itself. The important thing in the software management is correct scheduling, so that the DSP engines 200A and 200B are not waiting for each other. The best utilization of all system resources can be achieved if the application is of such a nature that it can be distributed to execute in parallel on two engines. Fortunately, most of the audio compression algorithms fall into this category, since they involve a transform coding followed by fairly complex bit allocation routine at the encoder. On the decoder side the inverse is done. Firstly, the bit allocation is recovered and the inverse transform is performed. This naturally leads into a very nice split of the decompression algorithm. The first DSP core (DSPA) works on parsing the input bitstream, recovering all data fields, computing bit allocation and passing the frequency domain transform coefficients to the second DSP (DSPB), which completes the task by performing the inverse transform (IFFT or IDCT depending on the algorithm). While the second DSP is finishing the transform for a channel n, the first DSP is working on the channel n+1, making the processing parallel and pipelined. The tasks are overlapping in time and as long as tasks are of the same complexity, there will be no waiting on either DSP side.

Decoder 100, as discussed above, includes shared memory of 544 words as well as communication "mailbox" (IPC block 1302) consisting of 10 I/O registers (5 for each direction of communication). FIG. 4 is a diagram representing the shared memory space and IPC registers (1302).

One set of communication registers looks like this
(a) AB_command_register (DSPA write/read, DSPB read only)
(b) AB_parameter1_register (DSPA write/read, DSPB read only)
(c) AB_parameter2_register (DSPA write/read, DSPB read only)
(d) AB_message_semaphores (DSPA write/read, DSPB write/read as well)
(e) AB_shared_memory_semaphores (DSPA write/ read, DSP B read only) where AB denotes the registers for communication from DSPA to DSPB. Similarly, the BA set of registers are used in the same manner, with simply DSPB being primarily the controlling processor.

Shared memory 204 is used as a high throughput channel, while communication registers serve as low bandwidth channel, as well as semaphore variables for protecting the shared resources.

Both DSPA and DSPA 200a, 200b can write to or read from shared memory 204. However, software management provides that the two DSPs never write to or read from shared memory in the same clock cycle. It is possible, however, that one DSP writes and the other reads from shared memory at the same time, given a two-phase clock in the DSP core. In this way several virtual channels of communications could be created through shared memory. For example, one virtual channel is transfer of frequency domain coefficients of AC-3 stream and another virtual channel is transfer of PCM data independently of AC-3. While DSPA is putting the PCM data into shared memory, DSPB might be reading the AC-3 data at the same time. In this case both virtual channels have their own semaphore variables which reside in the AB_shared_memory_ semaphores registers and also different physical portions of shared memory are dedicated to the two data channels. AB_command_register is connected to the interrupt logic so that any write access to that register by DSPA results in an interrupt being generated on the DSP B, if enabled. In general, I/O registers are designed to be written by one DSP and read by another. The only exception is AB_message_ sempahore register which can be written by both DSPs. Full symmetry in communication is provided even though for most applications the data flow is from DSPA to DSPB. However, messages usually flow in either direction, another set of 5 registers are provided as shown in FIG. 4 with BA prefix, for communication from DSPB to DSPA.

The AB_message_sempahore register is very important since it synchronizes the message communication. For example, if DSPA wants to send the message to DSPB, first it must check that the mailbox is empty, meaning that the previous message was taken, by reading a bit from this register which controls the access to the mailbox. If the bit is cleared, DSPA can proceed with writing the message and setting this bit to 1, indicating a new state, transmit mailbox full. The DSPB may either poll this bit or receive an interrupt (if enabled on the DSPB side), to find out that new message has arrived. Once it processes the new message, it clears the flag in the register, indicating to DSPA that its transmit mailbox has been emptied. If DSPA had another message to send before the mailbox was cleared it would have put in the transmit queue, whose depth depends on how much message traffic exists in the system. During this time DSPA would be reading the mailbox full flag. After DSPB has cleared the flag (set it to zero), DSPA can proceed with the next message, and after putting the message in the mailbox it will set the flag to I. Obviously, in this case both DSPs have to have both write and read access to the same physical register. However, they will never write at the same time, since DSPA is reading the flag until it is zero and setting it to 1, while DSPB is reading the flag (if in polling mode) until it is 1 and writing a zero into it. These two processes a staggered in time through software discipline and management.

When it comes to shared memory a similar concept is adopted. Here the AB_shared_memory_semaphore register is used. Once DSPA computes the transform coefficients but before it puts them into shared memory, it must check that the previous set of coefficients, for the previous channel has been taken by the DSPB. While DSPA is polling the semaphore bit which is in AB_shared_memory_ semaphore register it may receive a message from DSPB, via interrupt, that the coefficients are taken. In this case DSPA resets the semaphore bit in the register in its interrupt handler. This way DSPA has an exclusive write access to the AB_shared_memory_semaphore register, while DSPB can only read from it. In case of AC-3, DSPB is polling for the availability of data in shared memory in its main loop, because the dynamics of the decode process is data driven. In other words there is no need to interrupt DSPB with the message that the data is ready, since at that point DSPB may not be able to take it anyway, since it is busy finishing the previous channel. Once DSPB is ready to take the next channel it will ask for it. Basically, data cannot be pushed to DSPB, it must be pulled from the shared memory by DSPB.

The exclusive write access to the AB_shared_memory_ semaphore register by DSPA is all that more important if there is another virtual channel (PCM data) implemented. In this case, DSPA might be putting the PCM data into shared memory while DSPB is taking AC-3 data from it. So, if DSPB was to set the flag to zero, for the AC-3 channel, and DSPA was to set PCM flag to 1 there would be an access collision and system failure will result. For this reason, DSPB is simply sending a message that it took the data from shared memory and DSPA is setting shared memory flags to zero in its interrupt handler. This way full synchronization is achieved and no access violations performed.

When designing a real time embedded system both hardware and software designers are faced with several important trade-off decisions. For a given application a careful balance must be maintained between memory utilization and the usage of available processing bandwidth. For most applications there exist a very strong relationship between the two: memory can be saved by using more MIPS or MIPS could be saved by using more memory. Obviously, the trade-off exists within certain boundaries, where a minimum amount of memory is mandatory and a minimum amount of processing bandwidth is mandatory.

An example of such trade-off in the AC-3 decompression process is decoding of the exponents for the sub-band transform coefficients. The exponents must arrive in the first block of an AC-3 frame and may or may not arrive for the subsequent blocks, depending on the reuse flags. But also, within the block itself, 6 channels are multiplexed and the exponents arrive in the bitstream compressed (block coded) for all six channels, before any mantissas of any channel are received. The decompression of exponents has to happen for the bit allocation process as well as scaling of mantissas. However, once decompressed, the exponents might be reused for subsequent blocks. Obviously, in this case they would be kept in a separate array (256 elements for 6 channels amounts to 1536 memory locations). On the other hand, if the exponents are kept in compressed form (it takes only 512 memory locations) recomputation would be required for the subsequent block even if the reuse flag is set. In decoder 100 the second approach has been adopted for two reasons: memory savings (in this case exactly 1 k words) and the fact that in the worst case scenario it is necessary to recompute the exponents anyway.

The proper input FIFO is important not only for the correct operation of the DSP chip itself, but it can simplify the overall system in which decoder 100 resides. For example, in a set-top box, where AC-3 audio is multiplexed in the MPEG2 transport stream, the minimum buffering requirement (per the MPEG specification) is 4 kbytes. Given the 8 kbyte input FIFO in decoder 100 (divisible arbitrarily in two, with minimum resolution of 512 bytes), any audio bursts from the correctly multiplexed MPEG2 transport stream can be accepted, meaning that no extra buffering is required upstream in the associated demux chip. In other words, the demux chip will simply pass any audio data directly to the codec 100, regardless of the transport bit rate, thereby reducing overall system cost.

Also, a significant amount of MIPS can be saved in the output FIFOs, which act as a DMA engine, feeding data to the external DACs. In case there are no output FIFOs the DSP has to be interrupted at the Fs rate (sampling frequency rate). Every interrupt has some amount of overhead associated with switching the context, setting up the pointers, etc. In the case of the codec 100, a 32-sample output is provided FIFO with half-empty interrupt signal to the DSP, meaning that the DSP is now interrupted at Fs/16 rate. Subsequently, any interrupt overhead is reduced by a factor of 16 as well, which can result in 2–3 MIPS of savings.

In the dual DSP architecture of decoder 100 the amount of shared memory is critical. Since this memory is essentially dual ported resulting in much larger memory cells and occupying much more die area, it is very critical to size it properly. Since decoder 100 has two input data ports, and the input FIFO is divisible to receive data simultaneously from the two ports, the shared memory was also designed to handle two data channels. Since the size of one channel of one block of AC-3 data is 256 transform coefficients a 256 element array has been allocated. That is, 256 PCM samples can be transferred at the same time while transferring AC-3 transform coefficients. However, to keep two DSP cores 200a and 200b in sync and in the same context, an additional 32 memory locations are provided to send a context descriptor with each channel from DSPA to DSPB. This results in the total shared memory size of 544 elements, which is sufficient not only for AC-3 decompression implementation but also for MPEG 5.1 channel decompression as well as DTS audio decompression.

The PCM buffer size is another critical element since all 6 channels are decompressed. Given the AC-3 encoding scheme (overlap and add), theoretically a minimum of 512 PCM data buffer is required. However, given a finite decoder latency, another buffer of 256 samples for each channel is required so that a ping-pong strategy can be employed. While one set of 256 samples is being processed, another set of 256 is being decoded. A decode process must be completed before all samples in PCM buffer are played, but given a MIPS budget this is always true. So, no underflow conditions should occur.

A more detailed description of the system software and firmware can now be provided. Decoder 100 supports two boot loader programs, one residing in each ROM 202 associated with each of the two DSP cores 200. DSPB (200b) acts as a main interface to the Host, as in runtime, accepting application code for both DSPs 200, loading its own program or data memory 202b/203b, and in addition, transferring the application code for DSPA to the boot loader residing in DSPA (200a), which in turn loads its program memory 202a and data memory 203a.

The Host interface mode bits and autoboot mode status bit are available to DSPB in the HOSTCTL register [23:20] (MODE field). Data always appears in the HOSTDATA register one byte at a time. The only difference in DSPB boot loader code for different modes, is the procedure of getting a byte from the HOSTDATA register. Once the byte is there, either from the serial or parallel interface or from an external memory in autoboot mode, the rest of DSPB boot loader code is identical for all modes. Upon determining the mode from the MODE bits, DSPB re-encodes the mode in the DBPST register in the following way: 0 is for autoboot, 1 for Serial Mode, and 2 for Parallel Mode. This more efficient encoding of the mode is needed, since it is being invoked every time in the procedure Get_Byte_From_Host. During application run-time, the code does not need to know what the Host interface mode is, since it is interrupt-driven and the incoming or outgoing byte is always in the HOSTDATA register. However, during the boot procedure, a polling strategy is adopted and for different modes different status bits are used. Specifically, HIN-BSY and HOUTRDY bits in the HOSTCTL register are used in the parallel mode, and IRDY and ORDY bits from SCPCN register are used in the serial mode.

Each DSP 200a, 200b has an independent reset bit in its own CONTROL register (CR) and can toggle its own reset bit after successful boot procedure. DSPA soft reset will reset only DSPA core and will not alter DSPA's MAPCTL, PMAP, and DMAP memory repair registers. DSPB soft reset will reset DSPB core as well as all I/O peripherals, but will not alter DSPB's MAPCTL, PMAP, and DMAP memory repair registers. Synchronized start is not an issue since the downloaded application code on each DSP handles synchronization.

Three major subroutines are described here. The first one is Get_Byte_From_Host, which is mode-sensitive (checking is done on the encoded value in DBPTMP register). The byte is returned in the AR6 register.

The second subroutine is Send_Byte_To_Host, which takes the byte in AR6 and sends it to the Host. This routine is not mode-sensitive, since when a byte is to be sent to the Host, the previous byte has already been picked up. This is true since messages returning to the Host are only byte-wide and only of two kinds, solicited or unsolicited.

Solicited
BOOT_START
DSPA/DSPB_MEMORY_FAILURE
BOOT_SUCCESS
BOOT_ERROR_CHECKSUM (in which case the Host is waiting for the response)
Unsolicited
BOOT_ERROR_ECHO
BOOT_ERROR_TIMEOUT (in which case the Host is sending or waiting to send image data and therefore has no pending byte to read).

In either case, DSPB can safely send out a byte without checking whether the resource is busy.

The third important subroutine is Get_Word_From_Host. This subroutine returns one 24-bit word in the COM_BA register after using registers ACC0 and AR6 as temporary storage. Actually, Get_Byte_From_Host is invoked three times within Get_Word_From_Host and the incoming byte in AR6 is shifted appropriately in ACC0. The Get_Word_From_Host subroutine also updates the checksum by using ADD instead Of XOR. The running checksum is kept in register PAR_2_BA. Note that there is no Send_Word_To_Host subroutine, since all replies to the Host are a full byte wide.

Figure 5A:
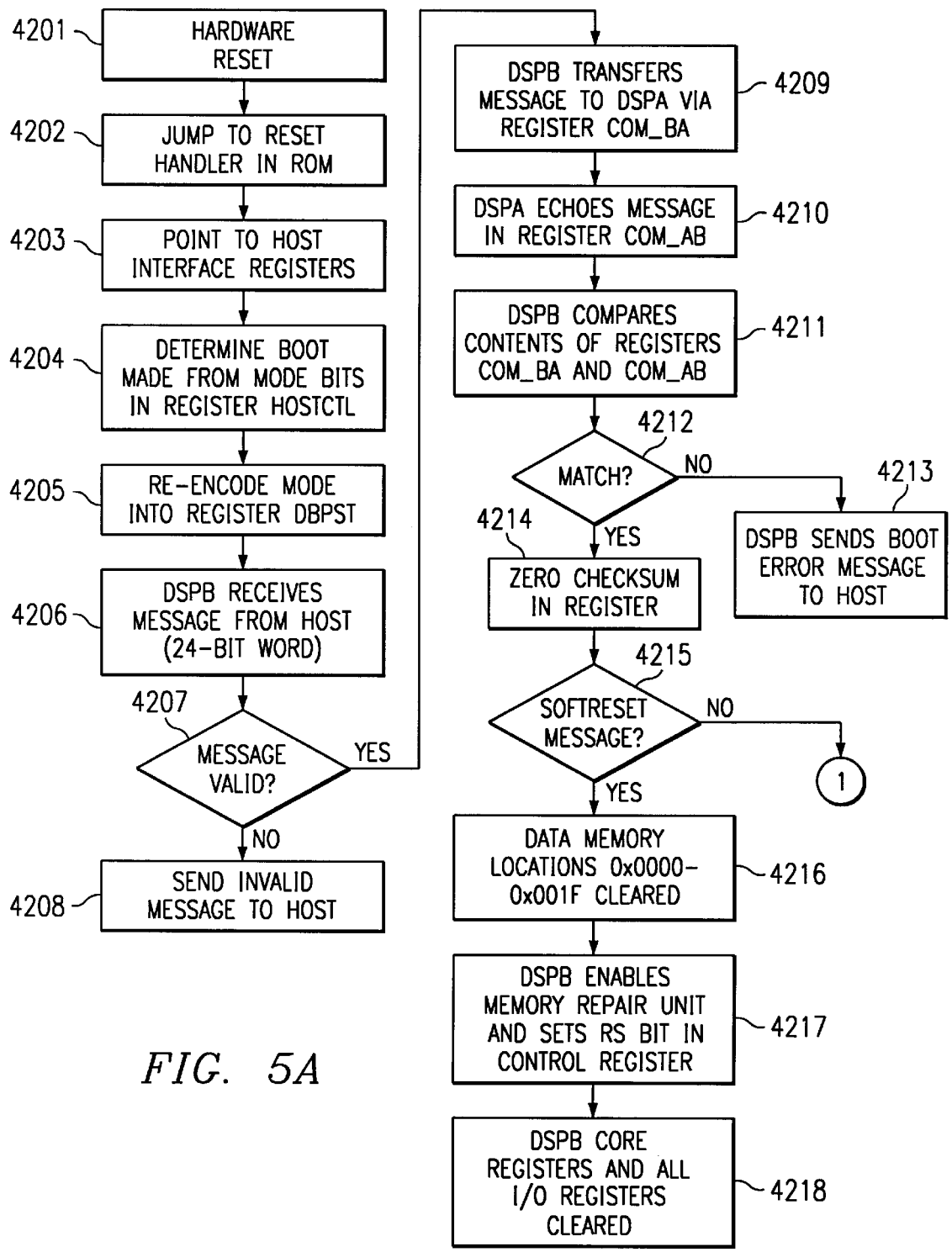
Figure 5B:
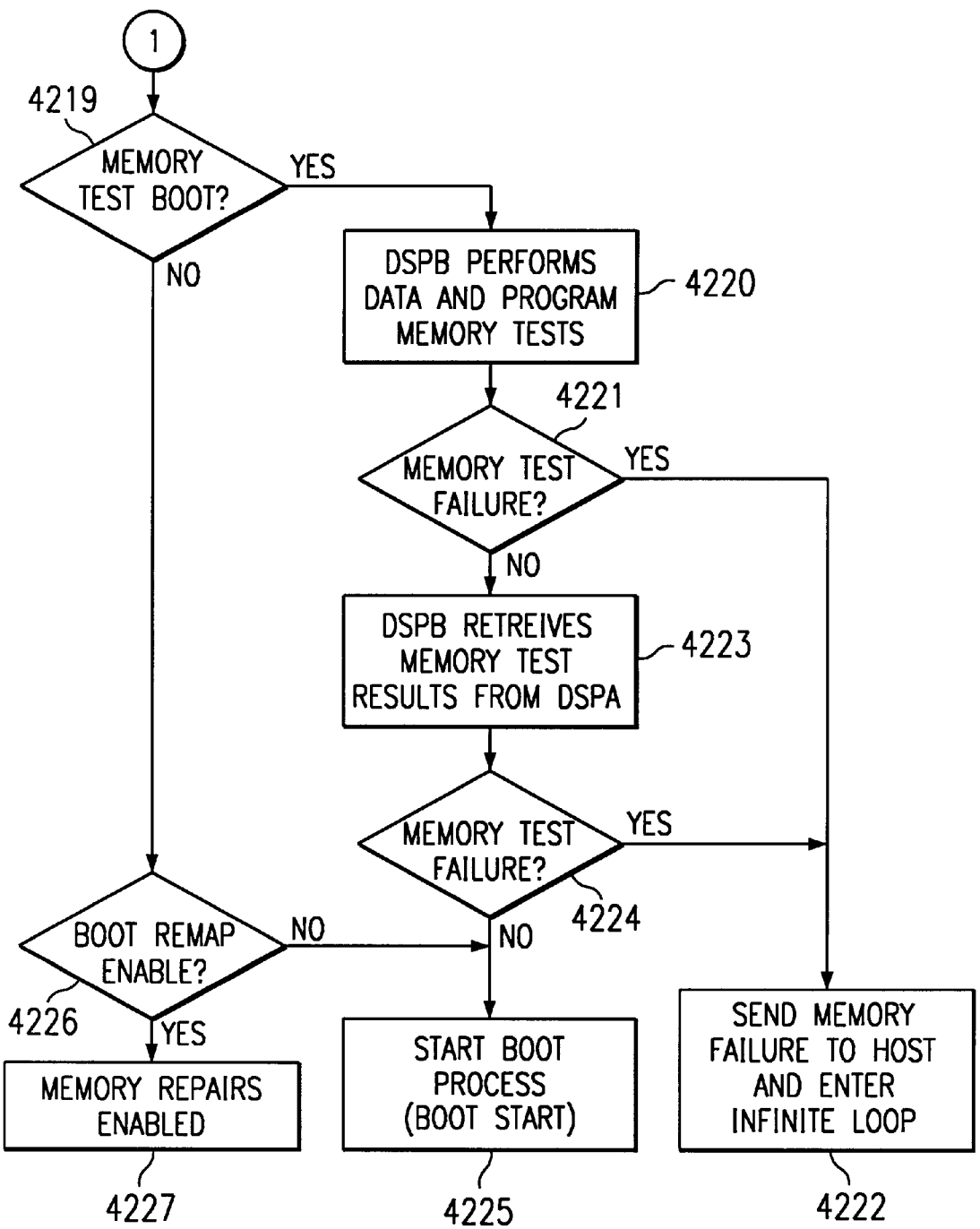

A boot routine suitable for multiprocessing applications can now be described in conjunction with the flow chart of FIG. 5, along with description of the interprocessor communication protocol of FIG. 4. Upon hardware reset (Step 4201) the code will jump to address 0x1000, which is the first address in the ROM, where a jump to the Reset_Handler subroutine is installed (Step 4202). In the Reset_Handler subroutine, the PAGE_B register is initialized to point to I/O PAGE_2, since the Host interface registers reside there (Step 4203). Then, the code determines the boot mode from the MODE bits in the host control (HOSTCTL) register (Step 4204) and re-encodes the mode in the DBPST register (Step 4205), as described above.

At this point DSPB is waiting for the Host to send a message. There is no timeout here. The Host must send a message describing what should happen next (Step 4206). The message itself is a 24-bit word. Four types of messages can arrive at this point. They are SOFTRESET (0x000001), BOOT_REMAP_ENABLE (0x00002), BOOT_REMAP_DISABLE (0x00003) and MEMTEST_BOOT (0x000004). If the incoming message is not within this range (1.4) (Step 4207), DSPB sends back the INVALID_MSG_BYTE (0xfb) to the Host (Step 4208). If the message is valid, DSPB will send the same message to DSPA. The subroutine Send_Word_To_DSPA_Check_Echo is used to transfer the message from DSPB to DSPA (Step 4209) via the COM_BA register. Since the message is already in the COM_BA register, this subroutine only needs to set the bit in the command pending register COM_P_BA. In order to ensure reliable communication, DSPA will echo the message in the COM_AB register (Step 4210). DSPB compares the value in register COM_BA and COM_AB (Step 4211) and if they do not match (Step 4212), DSPB sends the Host the BOOT_ERROR_ECHO_BYTE (0xfc)(Step 4213). Also, a timeout counter is used when waiting for echo, to avoid a deadlock situation. On timeout, DSPB interrupts the Host and sends it BOOT_ERROR_TIMEOUT_BYTE (0xfa), which indicates a communication problem with DSPA. In fact, the Host should also have timeouts of its own in order to detect communication problems with DSPB itself.

PAR_2_BA register (which contains the checksum) has to be zeroed at this point (Step 4214) since the first word from the Host (boot type message) does not contribute to the checksum.

If the message is SOFTRESET (Step 4215), DSPB will enable memory repair module (set MSB in the MAPCTL register), zero out the data memory location 0x0000–0x001f (Step 4216), and set the RS bit in the control register (Step 4217), which performs soft reset. All registers are reset in DSPB core as well as all I/O registers (Step 4218)(the DSPA soft reset clears only the DSPA core registers). However, the memory repair module is not affected at all, i.e., MAPCTL and all DMAP/PMAP registers are not reset. It is important to note here that DMAP/PMAP registers are not affected by either hardware or software reset, while MAPCTL is affected by hardware reset and not by software reset. Also, the four MODE bits in the host control register (HOSTCTL) register are not affected by either reset.

If the message from Host is MEMTEST_BOOT (Step 4219), DSPB will clear all DMAP/PMAP registers and perform both data and program memory tests (Step 4220), in that order. If either test fails, DSPB branches to Memory_Failure (Step 4221) where it sends DSPB_MEMORY_FAILURE_BYTE (0xfd) to the Host and terminates in an infinite loop (Step 4222). On the other hand, if DSPB memory tests are successful, it asks DSPA for its memory test results by sending it DSPA_MEMORY_CHECK_MSG (0x00001)—or any other word for that matter. By now, DSPA has certainly concluded its own memory test (since it has less memory to test) and echoes back or inverts the word received from DSPB, to indicate success or failure, respectively. The echo back enables DSPB to continue with the boot process. Otherwise, DSPB sends DSPA_

MEMORY_FAILURE_BYTE (0×fe) to the Host and terminates in an infinite loop.

If both DSPA and DSPB performed memory tests successfully (with possible repair), the boot process can start (Step 4225). At this point, the Host is actually waiting for a message that could be BOOT_START_BYTE (0×01), DSPA_MEMORY_FAILURE_BYTE (0×fe), or DSPB_MEMORY_FAILURE_BYTE (0×fd). Alternatively, the Host might have already received either BOOT_ERROR_ECHO BYTE (0×fc), due to IPC problems, or BOOT_ERROR_TIMEOUT (0×fa), due to DSPA timeout.

If the message is BOOT_REMAP_ENABLE (Step 4226), DSPB sets the MSB in the MAPCTL register (Step 4227), thus enabling whatever memory repair was done sometime earlier (Step 4227) (using the MEMTEST_BOOT message), and issues the BOOT_START message to the Host. (If the message is BOOT_REMAP_DISABLE, DSPB simply issues the BOOT_START message to the Host (leaving MAPCTL==0 and memory repair disabled). This mode is used in case we suspect the memory repair module itself, and want to leave it disabled all the time.)

Figure 6:
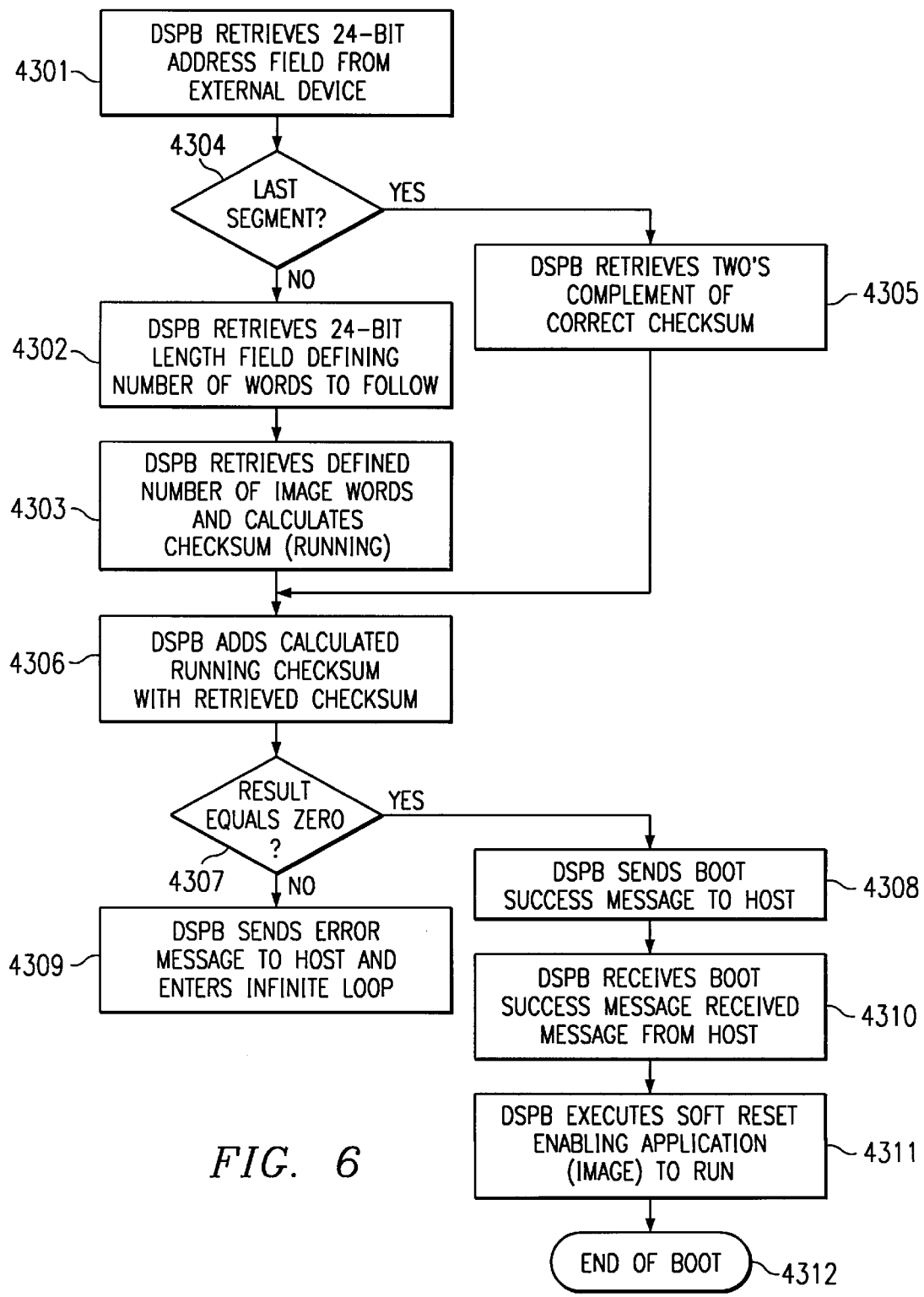
FIGS. 6A–6B are diagrams of a boot routine referenced to DSPB.

The boot process itself can now be further described with reference to FIG. 6. DSPB retrieves 24-bit words from the Host (or an independent boot ROM) using the Get_Word_From_Host subroutine. The loadable image has several segments and every segment has the following structure: a three-byte address field (retrieved from the external source at Step 4301), a three-byte length field (retrieved at Step 4302), and as many three-byte data (image) words to follow as indicated in the length field and retrieved at Step 4303. As each image word is retrieved, DSPB calculates a running checksum.

The most significant bit (MSB) of the address field discriminates between the DSPA and DSPB segments (MSB=1 for DSPA and 0 for DSPB), while MSB-1 of the same field determines whether the segment to be loaded is for program or data memory (MSB-1=1 for program memory and 0 for data memory).

For any segment other than the last segment, upon receiving the first word of the segment, DSPB determines whether it is the segment for DSPA by examining the MSB of the address field. If the MSB=1, DSPB calls the Load_DSPA_Segment routine and transfers the entire segment to DSPA. In order to transfer the proper number of words to DSPA, DSPB keeps a running counter in a register PAR_1_BA, which is initialized by the length field of the segment, and which is the next word received after the address. The data transfer between the two cores is performed using Get_Word_From_Host and Send_Word_To_DSPA_Check_Echo subroutines.

If the segment is not for DSPA (but it is rather for DSPB itself), DSPB examines the MSB-1 of the address field to determine whether it is a program or data memory segment. Depending on which memory is to be loaded, either registers PAR0 or AR2 are initialized as the memory pointer in the Load_PMEM_Segment (PAR0) and Load_DMEM_Segment (AR2) routines. Also, the PAR_1_BA register is used as a word counter and is initialized by the length field, which is the next word received after the address. Then the appropriate number of words are loaded into program or data memory.

This process (Step 4301–4304) is repeated for all segments until the final segment is encountered.

The last segment (Step 4304) has a special structure wherein the address field is 0×ffffff and the word that is retrieved at Step 4305 is the twos complement of the checksum that is calculated over the entire loadable image. Since the running checksum is calculated using add operations, the final result in DSPB should be 0 after adding the running checksum to the retrieved checksum at Step 4306. If the result of the addition equals zero, DSPB sends the BOOT_SUCCESS_BYTE (0×02) command to DSPA (Step 4309). If the checksum is result is non-zero (Step 4307), DSPB sends the BOOT_ERROR_CHECKSUM_BYTE (0×ff) to the Host (Step 4208), and terminates in an infinite loop.

After the host processor receives the boot success message at Step 4310 and sends a boot success received message to DSPB, DSPB at Step 4311 initiates a soft reset enabling the downloaded image (program) to run.

During the boot process itself, the Host can receive unsolicited messages (always single-byte) in the event of a DSPA timeout or IPC (interprocessor communication) errors. If a memory test is performed, then either BOOT_START or DSPA/B MEMORY_FAILURE messages can be sent to the Host (these are both solicited messages).

Figure 7A:
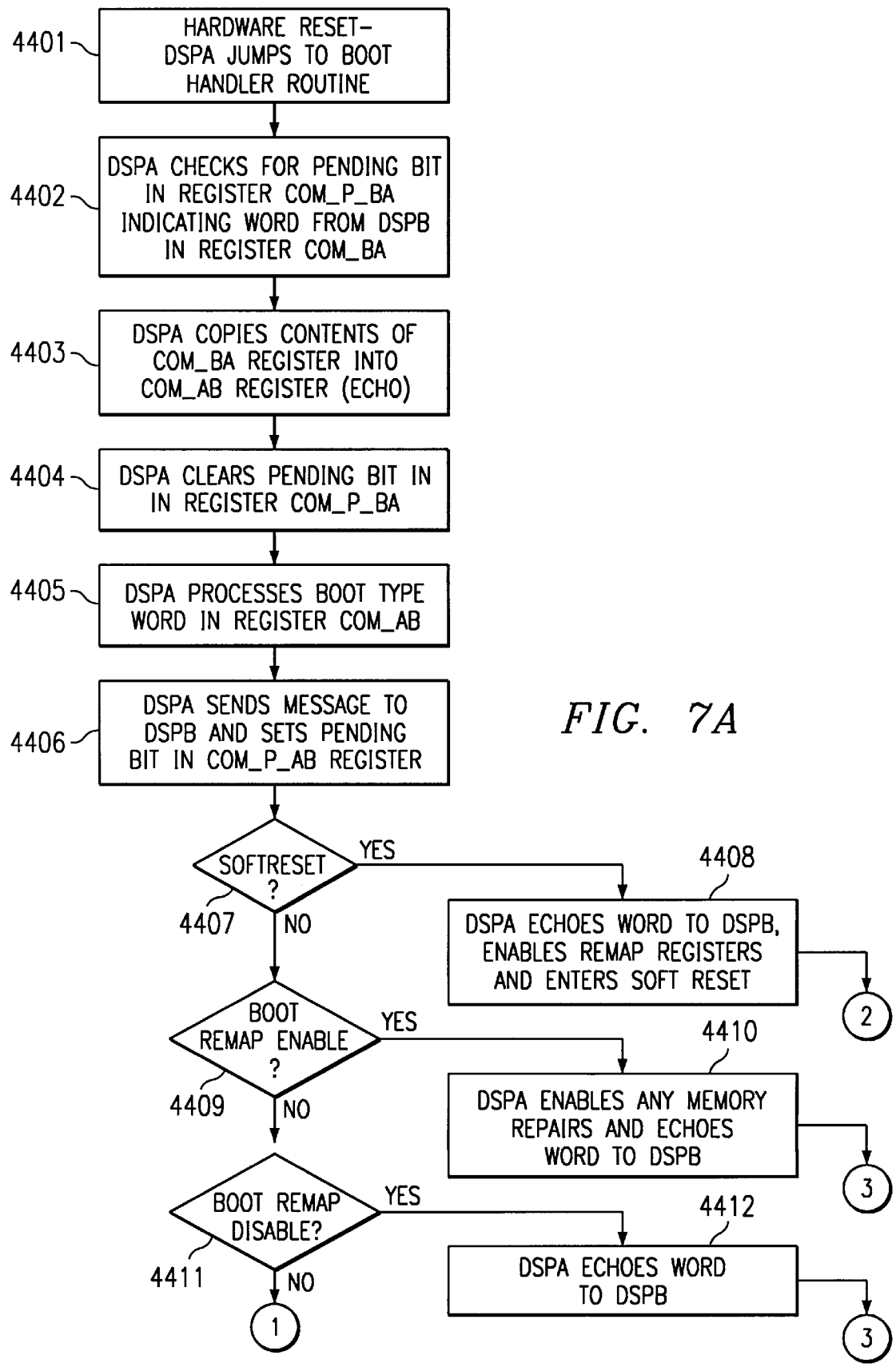
Figure 7B:
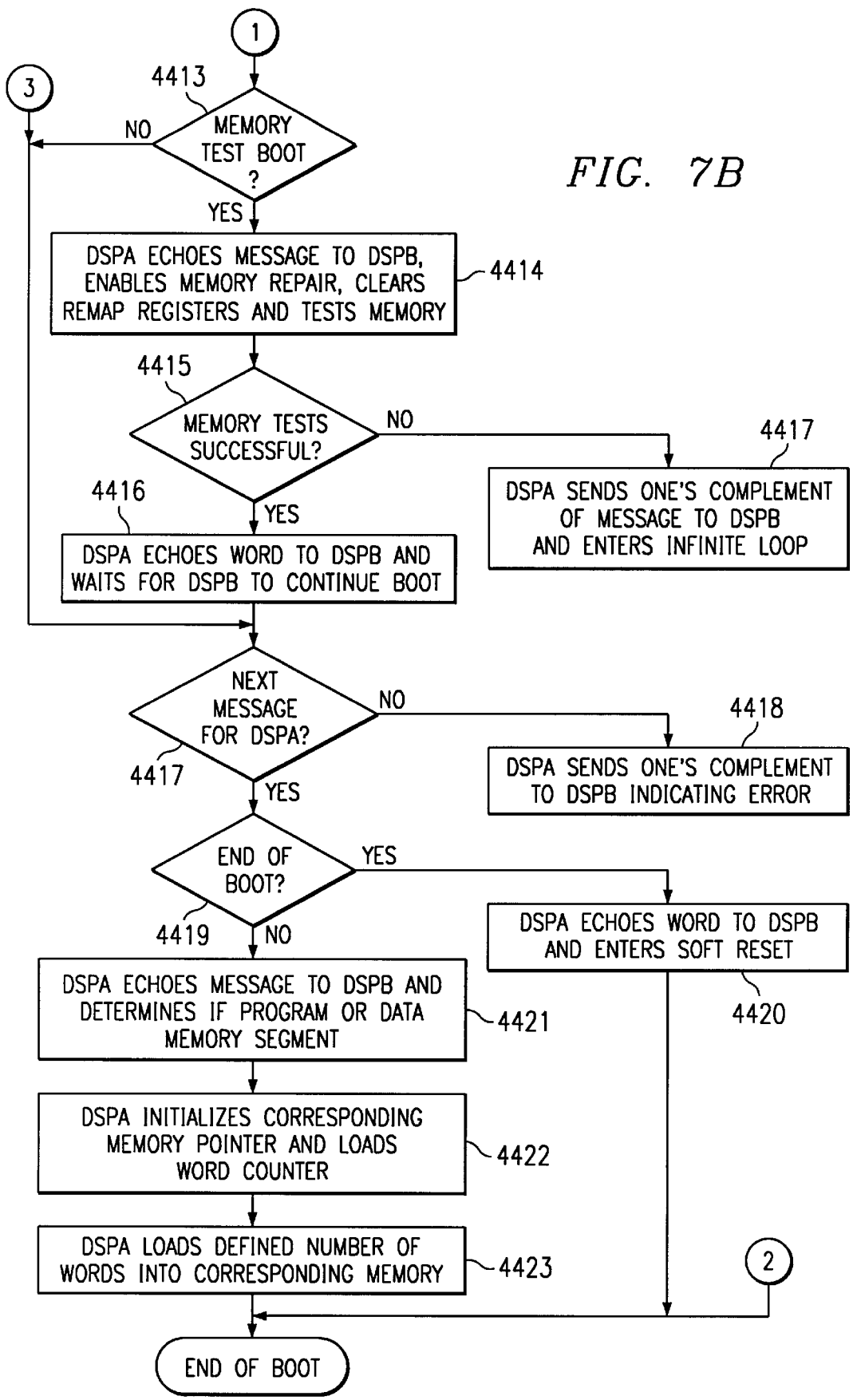

The DSPA boot code execution is described in conjunction with FIG. 7. Upon hardware reset DSPA boot code starts executing at address 0×1000 by jumping into the Reset_Handler routine (Step 4401). In this routine, DSPA is using the Get_Word_From_DSPB and Send_Word_To_DSPB routines. In Get_Word_From_DSPB, DSPA checks the pending bit in the COM_P_BA register (Step 4402) which is set after DSPB has put a word in the COM_BA register. Once the pending bit is set, DSPA copies the contents of the COM_BA register into the COM_AB register (echo at Step 4403) and clears the COM_P_BA bit (Step 4404). DSPA at Step 4405 processes the boot type word in register COM_AB the current word, and then invokes Send_Word_To_DSPB, which simply sets the pending bit in the COM_P_AB register (Step 4406).

If the boot-type word is a SOFTRESET (software reset) message (Step 4407), DSPA echoes the word back to DSPB (it always performs the echo to allow DSPB to continue), enables remap registers (by setting the MSB in the mapping control register MAPCTL register), and performs soft reset by loading control register appropriately (Step 4408). This Soft Reset clears only DSPA core registers. After the soft reset is performed, the end of boot for DSPA is complete.

If the word is BOOT_REMAP_ENABLE (Step 4409), DSPA sets the MSB in the MAPCTL register, thus enabling any required memory repairs that had been performed earlier (using MEMTEST_BOOT message). At step 4414, DSPA also echoes the word back to DSPB, and waits for DSPB to proceed with the boot.

If the message is BOOT_REMAP_DISABLE (Step 4409), DSPA simply echoes the message back to DSPB (leaving any memory repairs disabled), and waits for DSPB to proceed with the boot (Step 4416).

If the message is MEMTEST_BOOT (Step 4413), DSPA echoes the message to DSPB enables any memory repairs, clears all remap registers and then performs data and program memory tests (in that order at Step 4414). After the memory test and repair procedure is completed, DSPA will wait for DSPB to query the result of the memory tests with a message. If memory tests are passed (with possible remap) at Step 4415, DSPA echoes this message at Step 4416 and waits for DSPB to proceed with the boot. Otherwise, DSPA sends back the ones complement of the message to DSPB to indicate error at Step 4420. DSPB in turn detects the inverted message and sends DSPA_MEMORY_FAILURE_BYTE (0×fe) to the Host and decoder 100 terminates in an infinite loop.

If any other word is received, it is treated as the starting address specification of the next segment. DSPA then checks (Step 4417) whether the MSB=1 (which indicates that the segment is intended for DSPA), and if not, jumps to Step 4418 to BOOT_ERROR, which sends back the ones complement of the message to DSPB to indicate an error.

Once DSPA is waiting for the boot image from DSPB, it checks whether it received 0xffffff, which indicates END_OF_BOOT (Step 4419). In this case, DSPA simply echoes the message back (which enables DSPB to send BOOT_SUCCESS to the Host), and performs soft reset by setting the RS bit in the CR (Step 4420).

If end of boot has not been reached, DSPA echoes the word and examines the MSB-1 of the address field to determine whether it is a program or data memory segment at Step 4421. Depending on which memory is to be loaded, either DSPA the PAR0 or AR2 registers are initialized as the memory pointer in their respective Load_PMEM_Segment and Load_DMEM_Segment routines. Also, the PAR_1_AB register is used as a word counter and is initialized by the length field, which is the next word received after the address (Step 4422). Then the appropriate number of words are loaded into program or data memory (Step 4423) from the host or external boot ROM. When this Step is complete, end of boot is reached.

Figure 8:
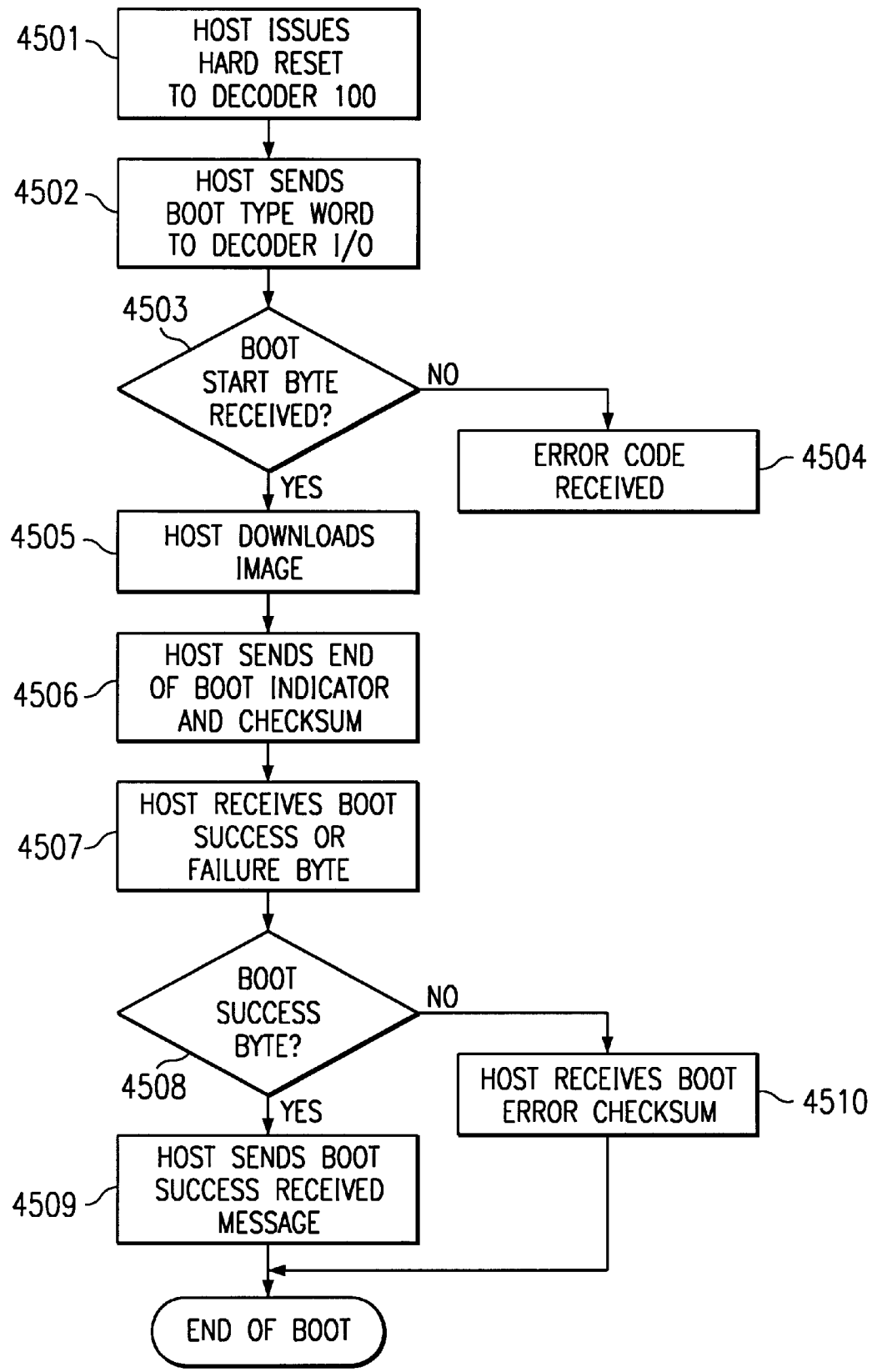
FIGS. 8A–8B are diagrams of a boot routine reference to the host.

The boot sequence from the host's perspective is described in conjunction with FIG. 8:

(a) Host issues hard reset and sets the mode bits appropriately to set Host mode (Step 4501);
(b) Host sends 3-byte BOOT_TYPE message (Step 4502)
  (1) SOFTRESET (0x000001): enables memory remap on both DSPs and issue softreset.
  (2) BOOT_REMAP_ENABLE (0x000002): enables remapping (to whatever previous setting the MAP registers had), sends out BOOT_START byte (0x01) and waits for image download.
  (3) BOOT_REMAP_DISABLE (0x000003): disables Remapping completely, sends out BOOT_START byte (0x01) and waits for image download.
  (4) MEMTEST_BOOT (0x000004): Performs Memory test on both DSPs.

The host then waits for a boot start byte from decoder 100 at Step 4503. In addition, for boot modes 2–4 (those that involve download), the first byte coming out of decoder 100 may be one of the following error codes instead of BOOT_START (Step 4504):

BOOT_ERROR_ECHO (0xfc): Indicates an interprocessor communications (IPC) error, i.e., DSPA did not echo DSPB's IPC message correctly.

BOOT_ERROR_TIMEOUT (0xfa): DSPB timed out after sending DSPA an IPC message and DSPA failed to echo it back.

(After any error report, both DSPs terminate in an infinite loop.)

(5) Once the host observes the BOOT_START response from Decoder, it starts sending in the bytes from the downloadable (.LD) file using the procedure and structure discussed above in conjunction with FIG. 6 (Step 4505).
(6) The last 6 bytes of the .LD file contain the 0xffffff End_Of_Boot indicator, and the 3-byte Checksum (Step 4506).
(7) Host receives a boot success or error byte (Step 4507). If checksum is correct (Step 4508), the decoder will report BOOT_SUCCESS byte (0x02) to the host and will wait for host to respond with the message BOOT_SUCCESS_RECEIVED (0x000005) Step 4509).

Once this message is received by the decoder 100, soft reset will happen and downloaded application will take control of the chip.

(8) If checksum is wrong then decoder 100 will report BOOT_ERROR_CHECKSUM byte (0xff) to the host (Step 4510) and both DSPs will terminate in an infinite loop.

Since the decoder 100 has substantial on-chip memory, special memory repair (remap) hardware, has been implemented to increase silicon yield in the event of defective memory locations. Remap registers are provided for program and data memory that contain bad addresses. When a particular remap register is enabled, all data transfers to the corresponding memory address are substituted by accesses to a secondary 24-bit memory cell. On average, 2 bad memory locations per kiloword can be repaired.

As elaborated in the above discussion of the "boot loader," at reset the Host has the option of initiating four kinds of reset: SOFTRESET (no memory check and no boot), BOOT_REMAP_DISABLE, BOOT_REMAP_ENABLE (but no memory check), and MEMTEST_BOOT.

The BOOT_REMAP_DISABLE reset clears the mapping control (MAPCTL) register MSB on both DSPs, and then boots new code. This permits a complete bypass of the memory repair hardware.

The BOOT_REMAP_ENABLE reset sets the MAPCTL register (MSB=1). Since the PMAP/DMAP registers are not cleared at reset and retain their previous settings, any previous memory repair remains effective. Thus, as long as the first reset after powerup is a boot with memory check (MEMTEST_BOOT), subsequent resets can bypass the memory check, but still need to enable the MAPCTL register using BOOT_REMAP_ENABLE.

The following is a pseudo_microcode description of the generic memory check performed as part of MEMTEST_BOOT, the fourth kind of reset. In ROM, data and program memory tests are separate modules called by the reset handler in succession (data memory is checked first, since program memory check uses four data locations).

Memory_Test
  Initialize page register, memory pointer to first memory location to be checked, and MAP register pointer to first usable remap register.
Memory_Test_Loop
  Load 0x5a5a5a into current memory location and read back.
  Jump to Memory_Error if read-back failed.
  Load 0xa5a5a5 into current memory location and read back.
  Jump to Memory_Error if read-back failed.
Memory_Test_Loop_Continue
  If this was the last location, return from test successfully.
  Otherwise, increment pointer to next location and go back to Memory_Test_Loop.
  NOTE: Code should ensure that, after testing, each memory location is left with a value different from 0x5a5a5a5a in order to detect address decoding problems. Ideally, a unique address-related value should be left in the memory location.
Memory_Error
  If we are out of MAP registers exit to Memory Failure.
  Otherwise, remap the current memory location with current MAP register.
  Check the remapped location by writing and reading 0x5a5a5a and 0xa5a5a5.
  If the remapped memory is still bad, clear the current MAP register, increment MAP register pointer and repeat Memory_Error.

Otherwise, remap was successful, so increment MAP register pointer and rejoin Memory_Test_Loop_Continue.
Memory_Failure Report memory failure error to DSPB or Host as appropriate.

Spin in infinite loop. (Actually, do anything, since chip is unusable!).

Debugging of the decoder 100 may be performed in one of two available modes: Slave Mode and Non-Intrusive Mode. In Slave Mode, the specified DSP is halted and then dedicatedly responds to messages from the PC Debugger until instructed to continue maincode execution.

In the Non-Intrusive Mode, the PC Debugger can request reads (and even writes, if explicitly enabled by the GUI user) from/to either DSP with only minimal intrusion on the application code being currently executed. This allows for dynamic debugging and watching/scoping variables in near-real-time. In order to maintain non-intrusiveness, constraints are placed on the PC Debugger to limit the bandwidth of messages that it can issue to the decoder during Non-Intrusive Mode. Also, certain safety constraints are placed on the PC Debugger that prevent interference with the running application.

In sum, the principles of the present invention allow for the efficient booting of a multiprocessor system. For example, these principles can be applied to multiple signal processor applications, such as the audio decoder described above.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. A method of booting a multiple-processor system comprising the steps of:
    transferring a message from an external device a first register using a first processor;
    transferring the message from the first processor to a second processor, said step of transferring comprising the substeps of:
        setting a flag in a second register with the first processor;
        detecting the flag with the second processor;
        reading the message from the first register using the second processor: and
        clearing the flag with the second processor;
    checking that the message passed to the second processor without error;
    interpreting the message with a selected one of the first and second processors; and
    performing boot operations with the selected processor in response to said step of interpreting the message.

2. The method of claim 1 wherein said step of receiving a message comprises the step of receiving a multiple byte message from the external device on a byte by byte basis.

3. The method of claim 1 wherein said step of transferring the message to the second processor further comprises the substeps of:
    echoing the message transferred to the second processor in a second register associated with the second processor; and
    comparing the message in the first register with the echoed message in the second register to determine whether an error has occurred.

4. The method of claim 1 wherein said step of transferring the message from the external device comprises the substeps of:
    pointing to a set of interface registers holding messages issued by the external device;
    determining a boot mode from selected bits stored in register; and
    receiving the message from the external device through the interface registers.

5. The method of claim 1 wherein said step of performing boot loading operations comprises the step of performing a softreset comprising the substeps of:
    enabling system memory repair functions;
    clearing selected registers associated with the first processor;
    clearing system I/O registers; and
    clearing selected locations in system data memory.

6. The method of claim 1 wherein said step of performing boot loading operations comprises the step of performing memory boot tests comprising the substeps of:
    performing memory tests on first memory associated with the first processor using the first processor;
    determining if a failure has occurred during testing of the first memory using the first processor;
    performing memory tests on second memory associated with second processor using the second processor;
    transferring the results from the tests of the second memory to the first processor; and
    determining if a failure has occurred during testing of the second memory using the first processor.

7. The method of claim 1 wherein the processing system comprises an audio information processing system and said processors comprise digital signal processors.

8. The method of claim 1 wherein the external device comprises a host processor.

9. The method of claim 1 wherein the external device comprises a memory.

10. A method of booting a multiple-processor system comprising the steps of:
    retrieving an address word of an information segment from an external device with a first processor the segment comprising a plurality of words;
    determining with the first processor a destination processor and a destination memory from the address word;
    retrieving a second word of the segment from the external device with the first processor, said second word defining a number of words to follow in the segment;
    retrieving each of the defined number of following words from the external device; and
    sending each retrieved word to the destination processor and storing in the destination memory.

11. The method of claim 10 and further comprising the steps of:
    determining whether the segment is the last segment of the sequence of segments presented by the external device;

if the segment is not the last segment of the sequence, retrieving another segment; and if the segment is a last segment of the sequence, checking the validity of the sequence of segments comprising the substeps of:
- calculating a checksum for the sequence of segments with the first processor;
- adding the checksum to a two's complement checksum field received as part of the last segment with the first processor;
- if a result of said step of adding is a zero, generating a success message with the first processor; and if a result of said step of adding is a non-zero number, generating a fail message with the first processor.

12. The method of claim 11 and further comprising the substeps of:
- sending the success message to a second one of the processors; and
- echoing the success message back to the first processor from the second processor.

13. The method of claim 12 and further comprising the step enabling an application defined by the segments to be executed by the system.

14. The method of claim 11 wherein the external device comprises a host processing system.

15. The method of claim 11 wherein the external device comprises memory.

16. A method of booting a single-chip audio decoder having first and second digital signal processors comprising the steps of:
- issuing a reset signal to the audio decoder;
- sending a boot message to the decoder defining a boot process to be executed by the decoder;
- issuing a boot start byte from the decoder;
- sending bytes of a program to the decoder;
- sending an end of boot indicator and checksum to decoder; and
- waiting for a message indicating the results of a checksum test performed by the decoder.

17. The method of claim 16 wherein said step of sending a boot type message comprises the step of sending a boot type message selected from the group consisting of softreset, boot remap enable, boot remap disable, and boot with memory test messages.

18. The method of claim 16 and further comprising the steps of:
- receiving a boot success message from the decoder when the checksum test performed by the decoder is successful; and
- sending a boot success received message to the decoder.

19. The method of claim 16 and further comprising the step of receiving a boot error checksum message when the checksum test performed by the decoder indicates an error.

\* \* \* \* \*